United States Patent
Ashworth

[15] 3,671,062
[45] June 20, 1972

[54] INTERNAL COUPLING FOR CONNECTING U-SHAPED RAILS

[72] Inventor: James E. Ashworth, Moraga, Calif.
[73] Assignee: United States Steel Corporation
[22] Filed: May 13, 1971
[21] Appl. No.: 142,872

[52] U.S. Cl.................................................287/127, 287/2
[51] Int. Cl.............................................................F16d 1/00
[58] Field of Search...................287/58 CT, 2, 127; 285/397

[56] References Cited

UNITED STATES PATENTS

| | | | |
|---|---|---|---|
| 1,365,300 | 1/1921 | Boye | 287/58 CT |
| 3,453,011 | 7/1969 | Meinunger | 287/58 CT |
| 2,934,184 | 4/1960 | Moser | 285/397 X |
| 3,222,095 | 12/1965 | Gerus | 287/2 |
| 3,370,836 | 2/1968 | Ashworth et al. | 256/47 |
| 2,777,247 | 1/1957 | Rosenberg | 298/188.5 |

Primary Examiner—Andrew V. Kundrat
Attorney—Martin J. Carroll

[57] ABSTRACT

A U-shaped coupling is received snugly within two U-shaped rails which are to be connected. Each rail has an inwardly directed lip at the end of each leg extending toward its base. The coupling has an inwardly extending flange at the end of each leg forming an angle of less than 90° with its associated leg, the flange bearing against the free end of the associated lip. Engagement of the flanges with the lips force the coupling into tight engagement with the rails.

3 Claims, 2 Drawing Figures

PATENTED JUN 20 1972   3,671,062

INVENTOR
JAMES E. ASHWORTH

By *Martin J. Carroll*

Attorney

INTERNAL COUPLING FOR CONNECTING U-SHAPED RAILS

This invention relates to an internal coupling and, more particularly, to a coupling for connecting a trigonal U-shaped fence rail of the type shown in Ashworth et al. U.S. Pat. No. 3,370,836 dated Feb. 27, 1968. This rail has an inverted U-shape with an internally turned-up lip at the bottom of each leg of the rail. These rails are galvanized after forming and excessive zinc tends to solidify near the end of the drain period as it is withdrawn from the zinc. The connector used prior to my invention had an inverted U-shape with the legs of the U extending downwardly into the turned-up lips of the rail. The length of the legs and the overall width of this coupling must match the internal dimensions of the two rails to be connected. There is no give in the present coupling design and variations in size in the coupling and/or rails cannot be compensated for so that there must be a loose fit. In some instances, the thickness of the zinc coating in the inside of the lips of the rail is so great that the coupling cannot be inserted.

It is therefore an object of my invention to provide a coupling which can make a tight connection between two U-shaped trigonal rails.

Another object is to provide such a coupling which requires less tolerance than the coupling previously used.

Figure 1:
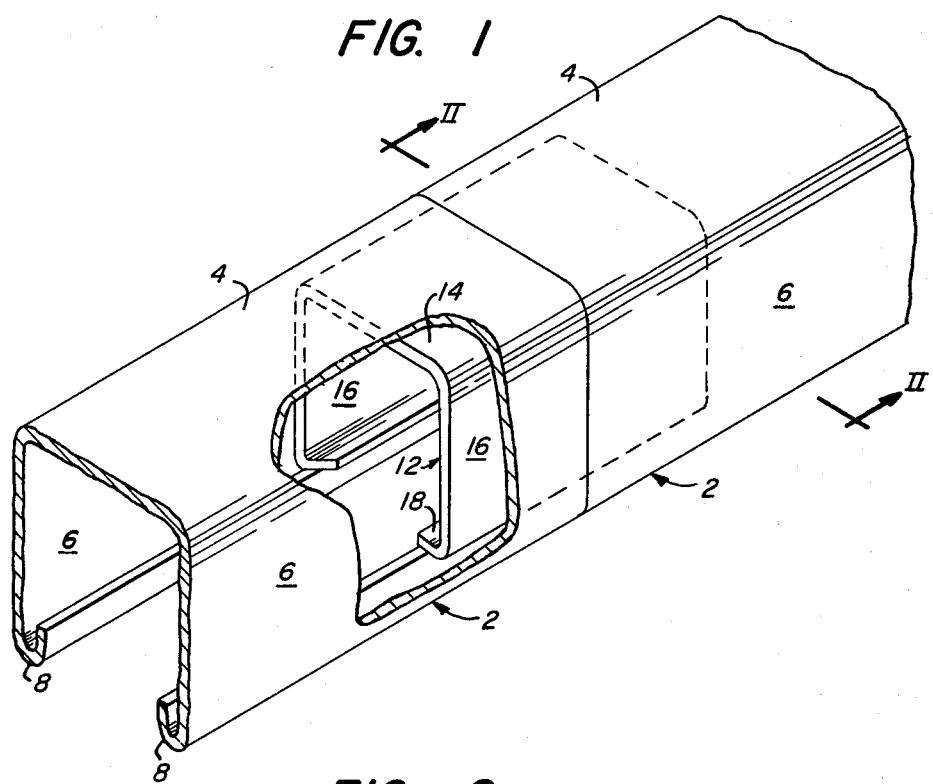
Figure 2:
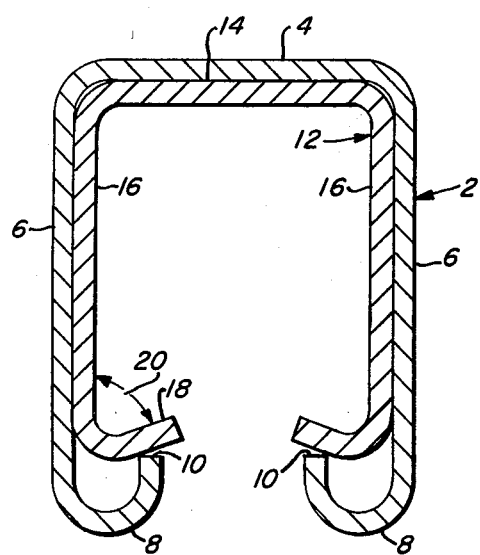

These and other objects will be more apparent after referring to the following specification and attached drawings, in which:

FIG. 1 is a perspective view of two rails and the connecting coupling with part broken away to show the end of the coupling; and FIG. 2 is a view taken on the line II—II of FIG. 1.

Referring more particularly to the drawings, reference numeral 2 indicates two metal rails which are to be connected. Each rail has an inverted U-shape with the base 4 at the top and downwardly extending legs 6. Each of the legs 6 has an inwardly directed turned-up lip 8 having a free top end 10. My improved metal coupling 12 also has an inverted U-shape with its base 14 having an outside width substantially the same as the inside width of the base 4. Vertical legs 16 extend downwardly from the base 14 to an elevation approximately the same as the top 10. A flange 18 extends inwardly and upwardly from the bottom of each leg 16 at an angle 20 with the leg 16. It is preferred that this angle be between 70° and 80°, although it may vary between 60° and 85° and still operate satisfactorily. When the coupling is inserted within the rails 2, the flanges 18 function as two-way acting leaf springs, each having a vertical and horizontal component. Thus, when inserted within the rails, the coupling is forced apart at its sides and also forced upwardly so that it bears snugly against both the base 4 and the legs 6 of the rails. This results from the contact of the flanges with the edges 10. Assuming that there is a 10-pound force at the contact between the flange 18 and the top 10 of lips 8 and that the angle 20 is 80°, there will be a 1.5 pound pressure forcing the leg 16 against the leg 6 and a 9.7 pound pressure forcing the base 14 against the base 4. When the angle 20 is 70° with the same 10-pound force, the side pressure will be 3.5 pounds and the upward pressure 9.4 pounds. Thus, a coupling is provided that need not have a close tolerance and yet results in a tight connection between the rails regardless of zinc build-up in the lips 8.

While one embodiment of my invention has been shown and described, it will be apparent that other adaptations and modifications may be made without departing from the scope of the following claims.

I claim:

1. A U-shaped coupling for connecting two U-shaped rails, each rail having a base, a leg connected to each side of said base, and an inwardly directed lip at the end of each leg extending toward said base, the free end of each lip being spaced inwardly from the adjacent leg and facing the base; said coupling comprising a base having an outside width substantially the same as the inside width of said rails, a leg connected to each side of said base, each leg having a length slightly greater than the distance between the inside of said rail base and the free end of said lip, and a flange extending inwardly from each coupling leg toward said base and across said free end of a respective lip so as to contact the free end of the associated lip on its edge closest to its respective rail leg, each flange forming an angle of less than 90° with its associated leg.

2. A U-shaped coupling according to claim 1 in which each flange forms an angle with its associated leg of between 60° and 85°.

3. A U-shaped coupling according to claim 1 in which each flange forms an angle with its associated leg of between 70° and 80°.

* * * * *